US010630635B2

(12) United States Patent
Uzelac

(10) Patent No.: US 10,630,635 B2
(45) Date of Patent: Apr. 21, 2020

(54) INTERNET PROTOCOL ENDPOINTS DATABASE IN A TELECOMMUNICATIONS NETWORK

(71) Applicant: Level 3 Communications, LLC, Broomfield, CO (US)

(72) Inventor: Adam C. Uzelac, Rochester, NY (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/175,027

(22) Filed: Oct. 30, 2018

(65) Prior Publication Data

US 2019/0075074 A1    Mar. 7, 2019

Related U.S. Application Data

(63) Continuation of application No. 15/363,765, filed on Nov. 29, 2016, now Pat. No. 10,122,678.

(60) Provisional application No. 62/341,964, filed on May 26, 2016.

(51) Int. Cl.
| | |
|---|---|
| *H04L 29/12* | (2006.01) |
| *H04L 12/725* | (2013.01) |
| *H04L 12/741* | (2013.01) |
| *H04M 1/64* | (2006.01) |

(52) U.S. Cl.
CPC .......... *H04L 61/157* (2013.01); *H04L 45/308* (2013.01); *H04L 45/3065* (2013.01); *H04L 45/745* (2013.01); *H04L 61/106* (2013.01); *H04L 61/1511* (2013.01); *H04M 1/64* (2013.01)

(58) Field of Classification Search
CPC .. H04L 12/2801; H04L 12/433; H04L 12/437
See application file for complete search history.

(56) References Cited

U.S. PATENT DOCUMENTS

| | | |
|---|---|---|
| 5,878,384 A | 3/1999 | Johnson |
| 6,754,224 B1 | 6/2004 | Murphy |
| 7,027,582 B2 | 4/2006 | Khello et al. |
| 7,406,170 B2 | 7/2008 | Gray et al. |
| 7,673,010 B2 | 3/2010 | Bennett |
| 8,135,022 B2 | 3/2012 | Sterman et al. |
| 8,254,278 B2 | 8/2012 | Sterman et al. |
| 8,804,567 B2 | 8/2014 | Sterman et al. |

(Continued)

OTHER PUBLICATIONS

International Search Report dated Feb. 21, 2017, Int'l Appl. No. PCT/US16/063994, Int'l Filing Date Nov. 29, 2016, 3 pgs.

(Continued)

*Primary Examiner* — Chandrahas B Patel

(57) ABSTRACT

Aspects of the present disclosure involve systems, methods, computer program products, and the like, for providing a directory or database of IP endpoints associated with users of a telecommunications network. The IP endpoints directory may be accessed by users or other networks to determine or obtain destinations within the network or accessible through the network that are associated with users or participants of the network. Through the database, networks and users may determine one or more endpoints for communications intended for a particular user. The results from the IP endpoint database may be then utilized to route communications along one or more routes through the network based on the information stored in the database.

20 Claims, 5 Drawing Sheets

(56) References Cited

U.S. PATENT DOCUMENTS

| | | | |
|---|---|---|---|
| 8,838,563 B2 | 9/2014 | Berkowitz et al. | |
| 9,686,416 B2 * | 6/2017 | Bianco | H04M 15/50 |
| 2014/0348159 A1 | 11/2014 | Sterman et al. | |
| 2017/0346784 A1 | 11/2017 | Uzelac | |

OTHER PUBLICATIONS

Written Opinion of the International Searching Authority dated Feb. 21, 2017, Int'l Appl. No. PCT/US16/063994, Int'l Filing Date Nov. 29, 2016, 8 pgs.

International Preliminary Report on Patentability, dated Nov. 27, 2018, Int'l Appl. No. PCT/US16/0063994, Int'l Filing Date Nov. 29, 2016, 10 pgs.

* cited by examiner

INTERNET PROTOCOL ENDPOINTS DATABASE IN A TELECOMMUNICATIONS NETWORK

TECHNICAL FIELD

Aspects of the present disclosure generally relate to systems and methods for implementing a telecommunications network, and more specifically for providing a database within a network to store and manage various endpoints for users of the network and routing communications based on the stored endpoints.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide Internet access to the customers of the network. Such services are typically requested by the customer to be provided by the network.

To communicate over the telecommunication network, a user typically uses a telephone to dial a telephone number that identifies a destination communication device. With the use of the dialed telephone number, the network connects the caller's device with the destination device and communication between the devices may occur. However, routing based on the dialed telephone number may not necessarily be the most efficient way to route communications to a user of the network. For example, a user may have multiple devices connected to or otherwise associated with the network through which the user receives or sends communications. Some devices may have more capabilities than others, such as a video capable device, a mobile device, or a traditional telephone device. Further, the dialed telephone number to reach a user may not necessarily provide the most useful way to connect with the user. For example, a user may be away from the office at certain times of the day such that communications intended for the user may not be received by the user at the user's office-based communication device. Without knowing the schedule or habits of the person receiving the call such that the caller knows which device the receiver wishes to be reached, many communications may simply not reach the desired user of the network.

SUMMARY

One implementation of the present disclosure may take the form of a method for routing a communication in a telecommunications network. The method may include the operations of maintaining a database of a plurality of Internet Protocol (IP) endpoints associated with a particular user of the telecommunications network and receiving a request for an IP endpoint for the particular user from a customer network in communication with the database, the request based on a intended communication for the user received at the customer network. The method may also include the operations of analyzing the request to determine a type of the intended communication and providing the IP endpoint for the particular user to the network based at least on the type of the intended communication, the IP endpoint comprising a routing information for transmitting the communication through the telecommunications network.

Another implementation of the present disclosure may take the form of a system for managing a telecommunications network. The system may include a database storing a plurality of Internet Protocol (IP) endpoints associated with a particular user of the telecommunications network and a database management server. The database management server may include at least one communication port for receiving a request for one of the plurality of IP endpoints associated with the particular user from a requesting network, the request based on a intended communication for the particular user received at the customer network, a processing device, and a computer-readable medium connected to the processing device configured to store instructions. When the instructions are executed by the processing device, the processing device performs the operations of analyzing the request to determine a type of the intended communication and providing the one of the plurality of IP endpoints for the particular user to the requesting network based at least on the type of the intended communication, the IP endpoint comprising a routing information for transmitting the communication through the telecommunications network.

DETAILED DESCRIPTION

Figure 1:
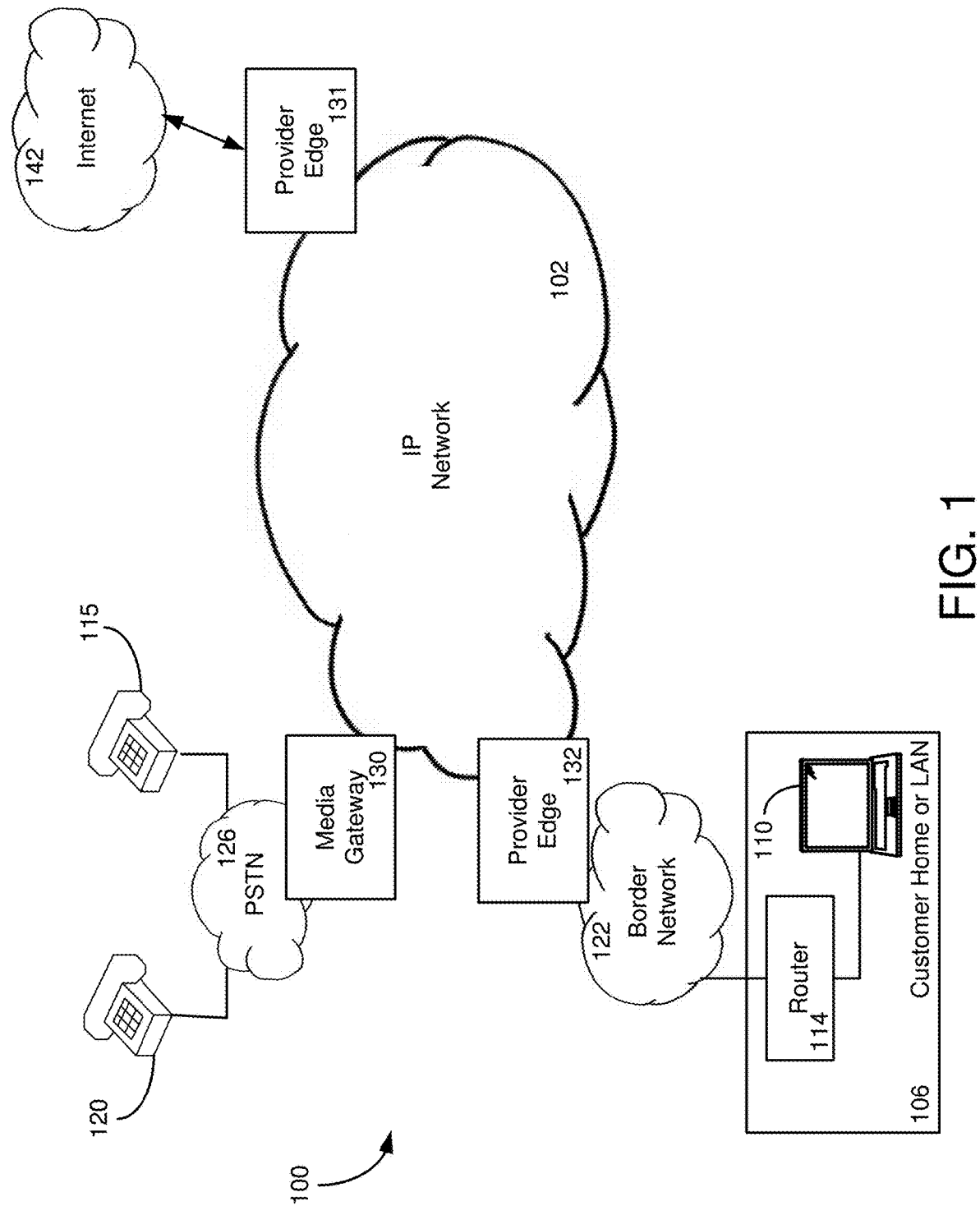
FIG. 1 schematic diagram illustrating an exemplary Internet Protocol (IP) operating environment in accordance with one embodiment.

Aspects of the present disclosure involve systems, methods, computer program products, and the like, for providing a directory or database of Internet Protocol (IP) endpoints or addresses associated with users of a telecommunications network. The IP endpoints directory may be accessed by users or other networks to determine or obtain destinations (referred to herein as "endpoints") within the network or accessible through the network that are associated with users or participants of the network. For example, a customer network may provide users or user devices with a telephone number associated with the device. The telephone number thereby identifies the end device and can be reached at the end device. Similarly, IP addresses may also be associated with a communication device of the network. Within the IP endpoint database, endpoint destinations may also be associated with the user in addition to a telephone number, such as one or more Session Initiation Protocol (SIP) uniform resource identifiers (URI) at which the user may be reached. Further, the user addresses may be stored to indicate the types of services available for the user at the various addresses. For example, a SIP URI endpoint for the user to receive Voice over Internet Protocol (VoIP) communications may be stored in the database and associated with the user. A different SIP URI endpoint for the user to receive video communications may also be stored in the database and associated with the user. Through the database, networks and users may determine one or more endpoints for communications intended for a particular user. The results obtained from the IP endpoint database may be then utilized by the requesting party to route communications along one or more routes through the network based on the information stored in the database.

To access the database, users or networks may provide a telephone number, a SIP address, or an Electronic Number Mapping (ENUM) address associated with a particular user of the network. With this information, the database may look-up and return one or more IP endpoints to the requesting user or network. Further, one or more users stored in the database may access the IP endpoint information stored in the database and configure such information to control when particular information is provided to requesting parties. For example, users, administrators, applications, and the like may have access to the database of IP endpoints. Through this access, control over which requesting networks or users that may receive the stored information may be defined, as well as control over how and when such information is provided. For example, the return of a user's particular information may be configured to be dependent on a time of day, a day of the week, on the type of request, on the number of accesses of the database, preferences of communication devices to receive the communication, the user's location, the requester's location, etc. In general, the database may be configured to provide particular endpoint information to a requesting user or network based on any consideration provided to the database. In this manner, communications intended for the users of the network may be controllable by utilizing the various parameters on which IP endpoint of the user is returned when a request for a user endpoint is received at the IP endpoint database.

FIG. 1 illustrates an exemplary operating environment 100 that may utilize an IP endpoint database as described above. In general, the environment 100 provides for establishing communication sessions between network users and for providing one or more network services to network users. For example, users to the network 100 may communicate with each other through communication devices, including voice communications and video communications. With specific reference to FIG. 1, the environment 100 includes an IP network 102, which may be provided by a wholesale network service provider. However, while the environment 100 of FIG. 1 shows a configuration using the IP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, and registrars, which enable communication and/or provides services across the IP network 102, but are not shown or described in detail here because those skilled in the art will readily understand these components. More relevant to this description is the interaction and communication between the IP network 102 and other entities, such as the one or more customer home or business local area networks (LANs) 106, where a user of the network will connect with the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the IP network 102 to other communication devices, such as another customer network 126 and/or the Internet 142. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the IP network 102.

The customer network 106 typically connects to the IP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the IP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the IP Network 102 through a media gateway device 130 or provider edge 132, 131. For ease of instruction, only three communication devices 110, 115, 120 are shown communicating with the IP network 102; however, numerous such devices, and other devices, may be connected with the network, which is equipped to handle enormous numbers of simultaneous calls and/or other IP-based communications.

In many IP networks 102, communications through the network are routed based on a SIP URI. For example, a user to the network 102 may utilize a communications device (such as a telephone) to dial a telephone number (TN) for the destination communication device. The user's device or other component within the network environment 100 converts the TN into a SIP URI associated with the destination communication device. The SIP URI is then utilized by the network 102 to route the communication through the network to the destination device associated with the dialed TN. In a similar manner, an ENUM address associated with the destination device may also be utilized. In general, an ENUM database maps public TNs to SIP URIs associated with the TNs. Thus, providing a dialed TN to the ENUM database returns a SIP URI associated with the dialed TN, upon which communications intended for the end user device may be transmitted through the network.

Regardless of how the identification of the destination device for the dialed TN is obtained, routing based on the dialed TN may not necessarily be the most efficient way to route communications to a user of the network. For example, a user may have multiple devices connected to or otherwise associated with the network through which the user receives or sends communications. Some devices may have more capabilities than others, such as a video capable device, a VoIP device, a mobile device, or a traditional telephone device. Further, the dialed TN to reach a user may not necessarily provide the most useful way to connect with the user. For example, a user may be away from the office at certain times of the day such that communications intended for the user may not be received by the user at the user's office-based communication device. Thus, forwarding of communications intended for the user to a mobile device that is with the user during these times may aid the network in connecting to the user's communication device. Further still, some features of a communication session between components of the network may not be provided based on the SIP URI routing. For example, some video communications may be routed through a PSTN network 126 to a user's end device that removes the capability for video communications. As such, the receiving device may only receive the audio portion of the communication with the video portion being removed, whereas routing the communication to a video-capable device may allow the user to receive the video portion. Thus, having access to alternate endpoints and routing options to which communications intended for a user may be routed through the network may improve the overall performance of the network and the experience of the network to its users.

Figure 2:
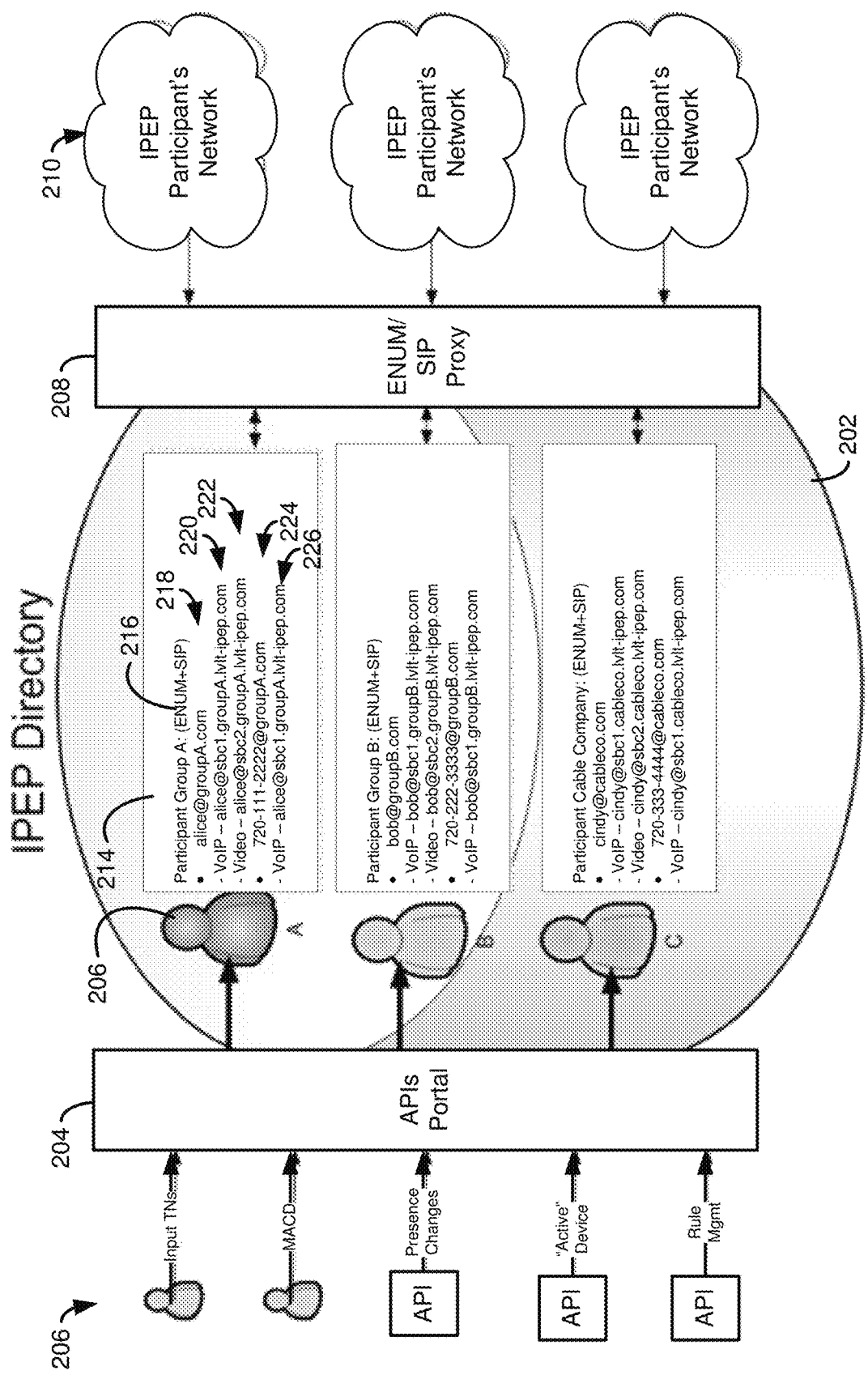
FIG. 2 is a schematic diagram illustrating an IP endpoint database of users of a telecommunications network.

To provide alternate endpoints and customer device identifiers to requesting parties, an IP endpoint database may be provided in conjunction with the network. FIG. 2 is a schematic diagram illustrating an IP endpoint database 202 of users of a telecommunications network for use by one or more users or networks in communication with the telecommunications network. Although illustrated as a single database 202, it should be appreciated that the information of the database may be stored in any number of network devices, such as multiple application servers or storage servers. Further, management software may be executed on any number of computing device to control and manage the IP endpoint database 202. In one embodiment, the database 202 is maintained within a telecommunications network. In another embodiment, the database 202 is maintained within multiple networks. In addition, various copies of the database 202 may be maintained on one or more networks.

Generally, the IP endpoint database 202 includes some indications of users or customers of a telecommunications network and one or more associated IP endpoints for reaching those users. For example, the IP endpoints for a particular customer may be associated with multiple communication devices of the user that is registered with the network. In one embodiment, subsets of the users 212 of the network may be combined into groups. For example, the database 202 may include entries of enterprise networks 212. Enterprise customers, in general, are several users that utilize the network collected into a group or enterprise. One example of an enterprise customer is a company that provides usage of the network for each of its employees. Thus, the IP endpoint database 202, in one embodiment, may collect such groups of users belonging to a particular enterprise network together and store the group together within the database. As shown in the example database 200 of FIG. 2, enterprise network A may include the members of a first enterprise network, enterprise network B may include the members of a second enterprise network, and so on. However, it should be appreciated that the user information stored in the database 202 may be organized in any manner that is desired or useful to the telecommunications network.

In the database 202 of FIG. 2, three user groups 212 are illustrated with an example user profile 214 for a user of each group. It should be appreciated, however, that the groups of users stored in the database 202 may include any number of network users. In the example shown, endpoint information 214 for a user in group A 212 is illustrated. The information includes an indication 216 of the group or enterprise the user belongs to, noted in FIG. 2 as Participant Group A. The endpoint information 214 for the user may also be organized based on an ENUM identifier or a SIP identifier related to a TN associated with the user. Thus, the endpoint information 214 includes an ENUM identifier 218 of the user and/or a SIP URI 224 of a TN associated with the user 212. As explained in more detail below, a user or network to the database 202 may provide the ENUM identifier 218 and/or the SIP URI 224 of the user's TN to obtain additional endpoint information about the user. In other words, some identifier of one or more of the users of the network stored in the database 202 may be provided to the database to obtain additional endpoint associated with the user.

Regardless of the information provided to the database 202 to obtain the endpoint information associated with the user, the database may return one or more IP endpoints associated with the user. For example, when a SIP URI 224 associated with the TN of a user of the network is received, the database 202 may return a SIP URI 226 or other endpoint identifier of a communication device on which the user may receive VoIP or video communications. In other words, the database 202 may translate the dialed TN as a number associated with the user and, upon accessing information stored in the database 202 associated with that user, return a particular SIP URI 226 to the requester that aids the requester in routing a communication. The returned endpoint may provide a more direct routing path through the network to the requester such that the features of the communications are maintained. For example, the database 202 may determine a type of communication that is included with the request to the database, such as whether the communication is a VoIP communication or a video communication. For VoIP communications, the database 202 may return a first endpoint 220 of the identified user that directs the requester to a first border gateway (or session border controller) of the network that supports VoIP communications. Alternatively, for video communications, the database 202 may return a different endpoint 222 that directs the requester to a second border gateway of the network that supports video communications.

Further, the database 202 may return a different SIP URI whether the requester provides an ENUM identifier or a SIP URI from a dialed TN. Regardless of which SIP URI is returned by the database 202, the communication may be routed through the network based on the type of communication as determined by the database. The returned routes from the database 202 may provide a more direct path through the network such that communications routed through at the network may be directly controlled through the use of the various IP endpoints associated with the user in the database, rather than by the dialed TN and associated SIP address.

Similar blocks of information may also be associated with other users of other groups in the database. Thus, users or customers to the telecommunications network 102 may have several endpoints associated with the users stored in the database 202. Further, such information may be configurable by users to the network, network administrators, applications, and the like. In FIG. 2, the configurable nature of the user information in the database 202 is illustrated through the information providers 206 in communication with the database. In general, the user information 214 stored in the database may be provided to the database from several sources. For example, users or administrators 206 of enterprise networks may log into the database 202 through an application programmatic interface (API) portal 204 and provide the endpoint information to the database. In other embodiments, one or more applications or programs may be configured to access the database 202 through the API portal 204 and data dump the information into the database. Such information may be provided for an enterprise network at once or may be updated to add and remove new users to the groups 212. In yet another embodiment, administrators 206 of the telecommunications network may provide the information to the database 202 and/or update the stored information as needed.

Once the information is stored in the database 202, one or more users or networks may access the information for use in routing communications to an end user's device. Thus, participant networks 210 may utilize an ENUM/SIP Proxy 208 to provide user identification information to the database 202. The database 202, in turn, provides an endpoint SIP URI through the ENUM/SIP Proxy 208 to the requesting network 210. In this manner, the information stored in the database 202 is available to the participating networks 210 for routing communications to endpoints associated with users of the network. The use of the database 202 by a network is discussed in more detail with relation to FIG. 4.

Figure 3:
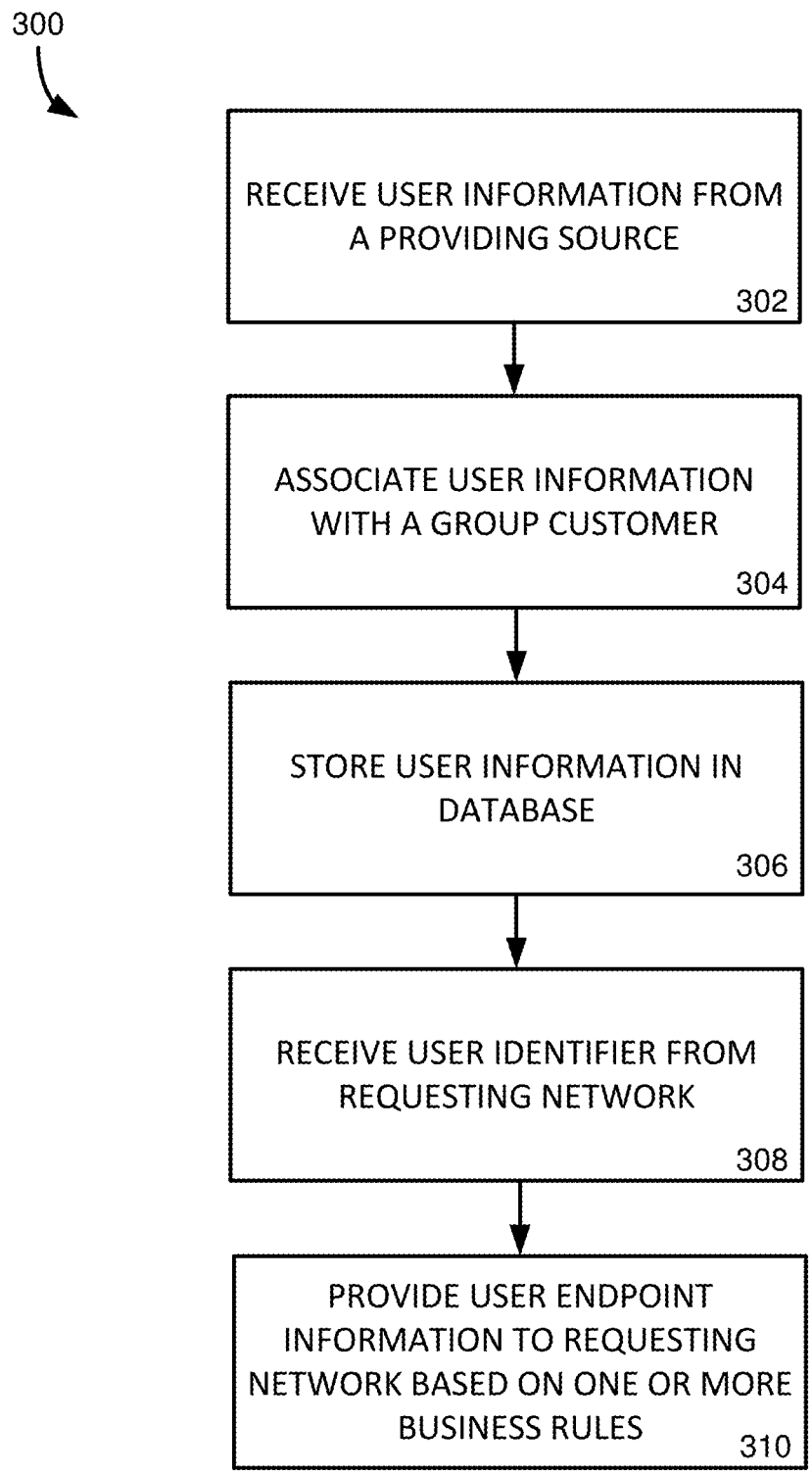
FIG. 3 is a flowchart of a method for managing an endpoint database for a telecommunications network

The storing and accessing of information for the IP endpoint database 202 is discussed in relation to the flowchart of FIG. 3. In particular FIG. 3 is a flowchart of a method 300 for managing an endpoint database for a telecommunications network. The operations of the method 300 may be performed by any telecommunication device or network management device, such as an application server in communication with the database. Through the method 300 described, a database of IP endpoints associated with users of a telecommunications network may be managed and utilized to route communications to users of the network.

Beginning in operation 302, the network may receive user information from a providing source. As described above, users, customers, administrators, customer networks, and the like may provide the user data to the network to be stored in the database. The user data may include identification information for the user, a group or enterprise identifier to which the user belongs, various endpoint communication devices associated with the user, etc. In general, any information about the user and the user's endpoints within the network may be provided to the network. In operation 304, the network associates the user information with a group (either through the information provided by the source or through accessing a look-up table managed by the network) and, in operation 306, stores the user information in the IP endpoint database. In this manner, the network may receive user endpoint information and store the information in the database for use by requesting networks or users to connect with the stored user information.

In operation 308, the network receives an identifier or request for information of a particular user of the network from a requesting network. In one embodiment, the request for information includes a particular type of communication the requesting network intends to transmit to the end user. For example, the received identification may request an endpoint for the user that can receive a video conference communication. In another example, the received identification may request an endpoint for the user that can receive a high definition audio communication. In another embodiment, the identifier of the particular user may include a TN, ENUM, or SIP address associated with the user that the database 202 may utilize to look up other IP endpoints of the user. Thus, in operation 310, the network obtains an IP endpoint for the particular user and provides the endpoint information to the requesting network or user. As explained in more detail below, the particular endpoint information provided by the network may be based on one or more business rules or settings maintained in the database 202.

Returning to the database 202 of FIG. 2, some information providers 206 may access the database and configure an entry in the database with one or more rules to control the database in providing the endpoint information 214. For example, one or more applications may provide status information concerning at least some of the users stored in the database. The status information of the user indicates whether the particular user is available at one or more of the devices associated with the stored endpoints for that user. One such application may be user's calendar program that includes the user's schedule and availability. The calendar program may be configured with an API to access the database 202 and provide the user's schedule and availability to the database. The database 202, in turn, may be configured to return one endpoint over another based upon the user's available status. For example, when the user's status indicates that the user is away from a first communication device (such as in a meeting or away from work for the weekend), the database 202 may be configured to return an endpoint associated with the user's mobile device. In another example, the database 202 may be configured to return an endpoint that terminates the communication at a networking device that plays a recorded message for the initiator that directs the initiator on how to contact the user. In yet another example, the user may himself provide the indication of his status to the database 202 through the portal 204 to control which endpoint is returned to requesting networks 210 from the database 202.

In addition to status information, the database 202 may be provided with location information for one or more users in the database. For example, a user in the database 202 may have a home address in Colorado such that many of the endpoints associated with the user terminate at communication devices in Colorado. However, in some instances, the user may be in another location, such as on vacation or working in England. The user's current location may be provided to the database 202 such that endpoints may be provided that are associated with the user's location. Continuing the above example, an England-based endpoint may be provided to the database 202 and associated with the traveling user. For the duration of the user's stay in England, the database 202 may be configured to provide the England-based endpoint to requesting networks 210 such that communications for the user are routed to the England-based endpoint. In particular, the user would not need to provide a temporary TN for the England-based endpoint device to users of the network that may attempt to contact the user. Rather, because a particular TN is associated with the user and stored in the database 202, an initiator may dial the particular TN to reach the user and the communication may be routed to the user in England based on the returned endpoint from the database. This may reduce the number of routes through the network to reach the user while improving the experience of using the network for the user as a single TN may be utilized to reach the user in multiple locations and on multiple devices.

Still other rules or configurations may be provided to the database 202 by one or more information providers 206 to control which endpoint SIP URI is returned to a requesting network 210. For example, a user may establish time of day rules to control the endpoint returned, such as returning a first endpoint SIP URI during typical work hours and a second endpoint during off hours. In another example, a user may provide an indication of a first endpoint to return when a request is made and, if that endpoint does not contact the end user, provide a secondary or backup endpoint. Another example includes establishing a rule in which more than one endpoint is returned such that a single communication is terminated at multiple endpoint devices. Still other rules may include limiting access to one or more endpoints based on information of the requesting network (such as providing a first endpoint for requesting networks within the user's enterprise and another endpoint for other networks), returning endpoints that are geographically or logically close to the requesting device to reduce distance of transmission of communications through the network, based on one or more technical features of the requesting network or communication, and the like. Some endpoint return rules may be provided and altered by information providers 206 to the database 202 or may be established by an administrator of the database 202 to improve the performance of the database or the network. In general, any rule that configures the database 202 and/or controls which endpoint is provided by the database 202 in response to a request for an IP endpoint of a user may be included in the operation of the database.

Figure 4:
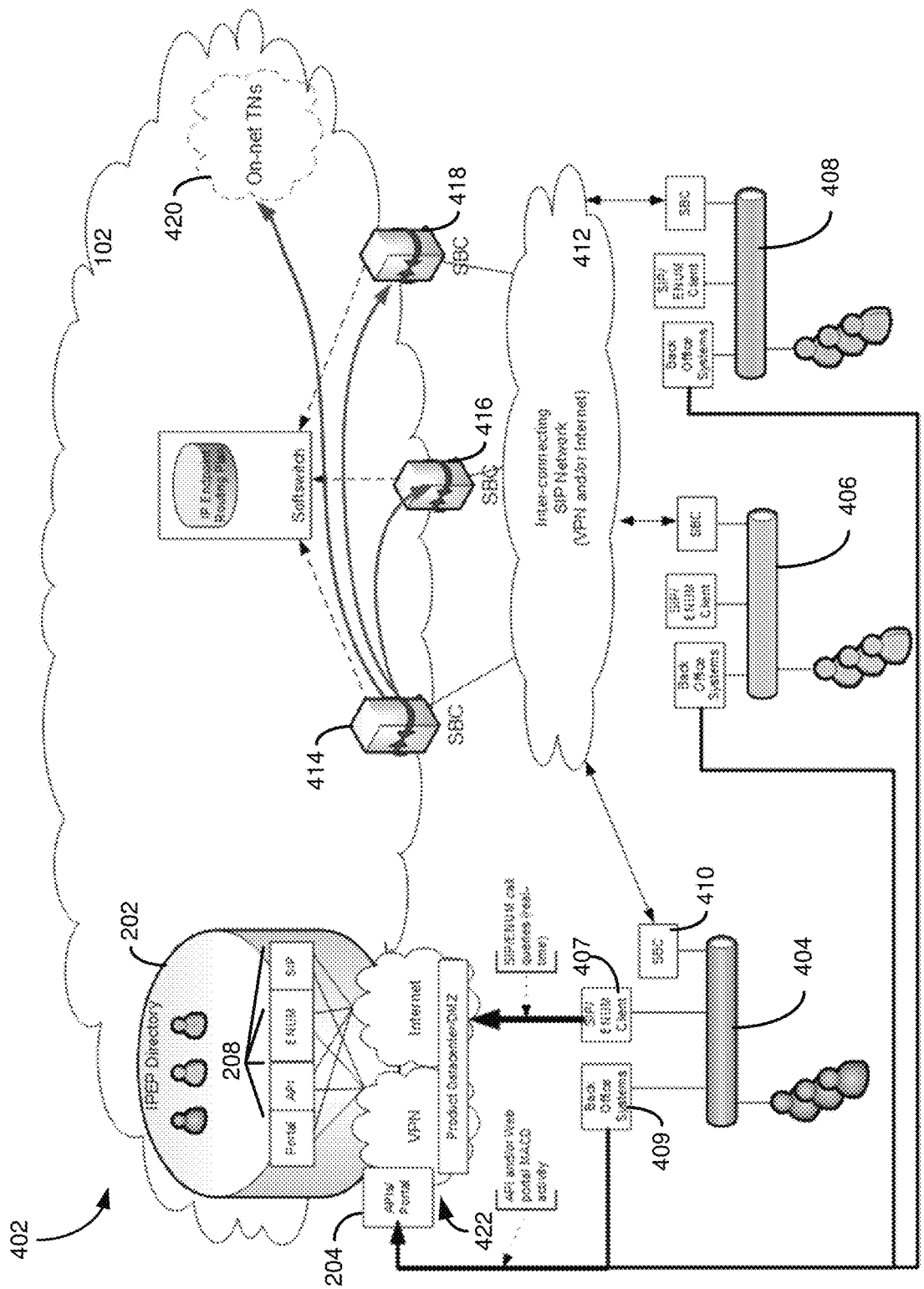
FIG. 4 is a schematic diagram of an IP network utilizing an IP endpoint database to route one or more communications through the network.

FIG. 4 is a schematic diagram of an IP network 402 utilizing an IP endpoint database 202 to route one or more communications through the network. Similar to that described above, the network 402 of FIG. 4 illustrates just some of the components utilized to transmit a communication from an initiating device to a terminating device. Other networking components may be used and are contemplated. Further, the embodiment provided is but one example of how an IP endpoint database 202 may be utilized and managed by a telecommunications network. Other uses and embodiments are also contemplated.

The network environment 402 includes a telecommunications network 102 similar to that described above with relation to FIG. 1. In communication with the network 102 are one or more customer networks, illustrated here as customer networks 404-408. Each customer network 404-408 may include a back office system 409, a SIP/ENUM client application 407, and an SBC 410 to communicate with a border network 412. The border network 412 may be any known or hereafter developed network that allows for transmission of communications through the network. In some instances, the customer networks 404-408 may be connected to separate border networks 412 to access the telecommunications network 102. One or more SBC devices 414-418 provide access to the telecommunications network 102 from the border network 412.

To utilize the database 202, a customer network 404 receives a communication from a user to the customer network through a communication device. For example, a user may dial a TN associated with a destination device. Typically, the customer network 404 would route the communication to the border network 412 for transmission to the telecommunications network 102. In some instances, the customer network 404 (and in particular the SBC 410 of the customer network) converts the dialed TN into a SIP packet for routing. However, in this instance, the customer network 404 may utilize the IP endpoint database 202 to obtain an endpoint for a user associated with the dialed TN for routing the communication. In particular, the customer network 406 utilizes a SIP/ENUM client or API 406 to access the database 202 through a network 422. The network 422 may be a public network (such as the Internet) or a private network (such as a virtual private network (VPN)). Through the SIP/ENUM client 406, the customer network 404 provides a SIP URI or ENUM associated with the dialed TN. The provided SIP URI or ENUM is passed to an API portal or proxy 208 to access the information in the database 202. The endpoint information in the database 202 is provided, in one instance, to the database from a back office system 408 of the customer network 404 through an API portal 204, as described above. Any type of data management operation may be provided by the back office system 408, such as add, move, delete, or change the information stored in the database 202.

Through the information provided to the database 202, one or more IP endpoints are associated with a user of the telecommunications network 102. This information is obtained through providing the dialed TN to the database through the ENUM/SIP portal 208 by the customer network SIP/ENUM client application 406. Based on one or more rules or configurations of the database 208, an IP endpoint is returned to the border network 404 along the same path. In one example, the IP endpoint provided by the database 202 is a SIP URI at which a user device associated with the dialed TN may be reached. In turn, the customer network 404 utilizes the retuned IP endpoint to route the communication to the customer network SBC 410, to the border network 412, and to the telecommunications network 102 through one of the network SBC devices 414-418. Once received at the telecommunications network 102, the communication may be routed based on the IP endpoint provided by the database 202. For example, the communication may be routed to a device associated with a TN 420 maintained by the network 102, or may be routed to device of another customer network 406, 408 back through the border network 412. Regardless of the ultimate termination of the communication, the returned IP endpoint may be utilized by the network 102 to route the communication.

In one embodiment, the SIP URI returned from the database 202 may be based on the type of communication being sent from the customer network 404. For example, the SIP/ENUM client 406 may provide a SIP request to the database 202 through a network 422. By analyzing the SIP request, the database 202 may determine the type of communication, such as whether the communication is a high definition (HD) voice communication or a video communication. Further, some components of the telecommunications network 102 may support certain features while others cannot. For example, SBC 414 may be configured to process VoIP communications, but does not have the capability to process video communications or HD voice communications. Alternatively, SBC 416 may be capable of processing all such communications. Thus, upon analyzing the SIP request from the customer network 404, the database may determine that the communication is a video communication. The database 202 may then return a SIP URI to the customer network 404 that directs the communication to SBC 416. For standard VoIP communications, the database 202 may return a SIP URI that directs the communication to SBC 414. In this manner, the SIP URI route path to or through the telecommunications network 102 returned from the database 202 may be based on the type of communication being transmitted as determined from the analysis of the SIP request by the database. This additional control over the routing of communications through the network 102 may improve the overall performance of the network and experience by the users of the network.

In some instances, the VPN/Internet network 422, the border network 412, the telecommunications network 102, and/or the customer network 404-408 may include a SIP Session Manager (SSM) telecommunications device (not shown). In general, the SSM receives the SIP request from the customer network 404 (and more particularly, the SIP/

ENUM client 406 of the customer network) and queries the database 202 for the appropriate IP endpoint based on the SIP request. In one embodiment, the SSM may query the database 202 with an ENUM identifier associated with the SIP request based on an analysis of the request. The SSM may also receive the SIP URI from the database 202 and manage the transmission of the communication from the customer network 404 to the telecommunications network 102. In still other embodiments, the database 202 may be in communication with a traffic managing device or component to determine which SIP URI is returned to a requesting network. The database 202 may utilize the traffic managing device to provide a SIP URI based on a load at one or more of the telecommunication network devices to load share traffic among multiple such components. FIGS. 5-8 illustrate various network environments that utilize an IP endpoint database to route communications through the network.

Figure 5:
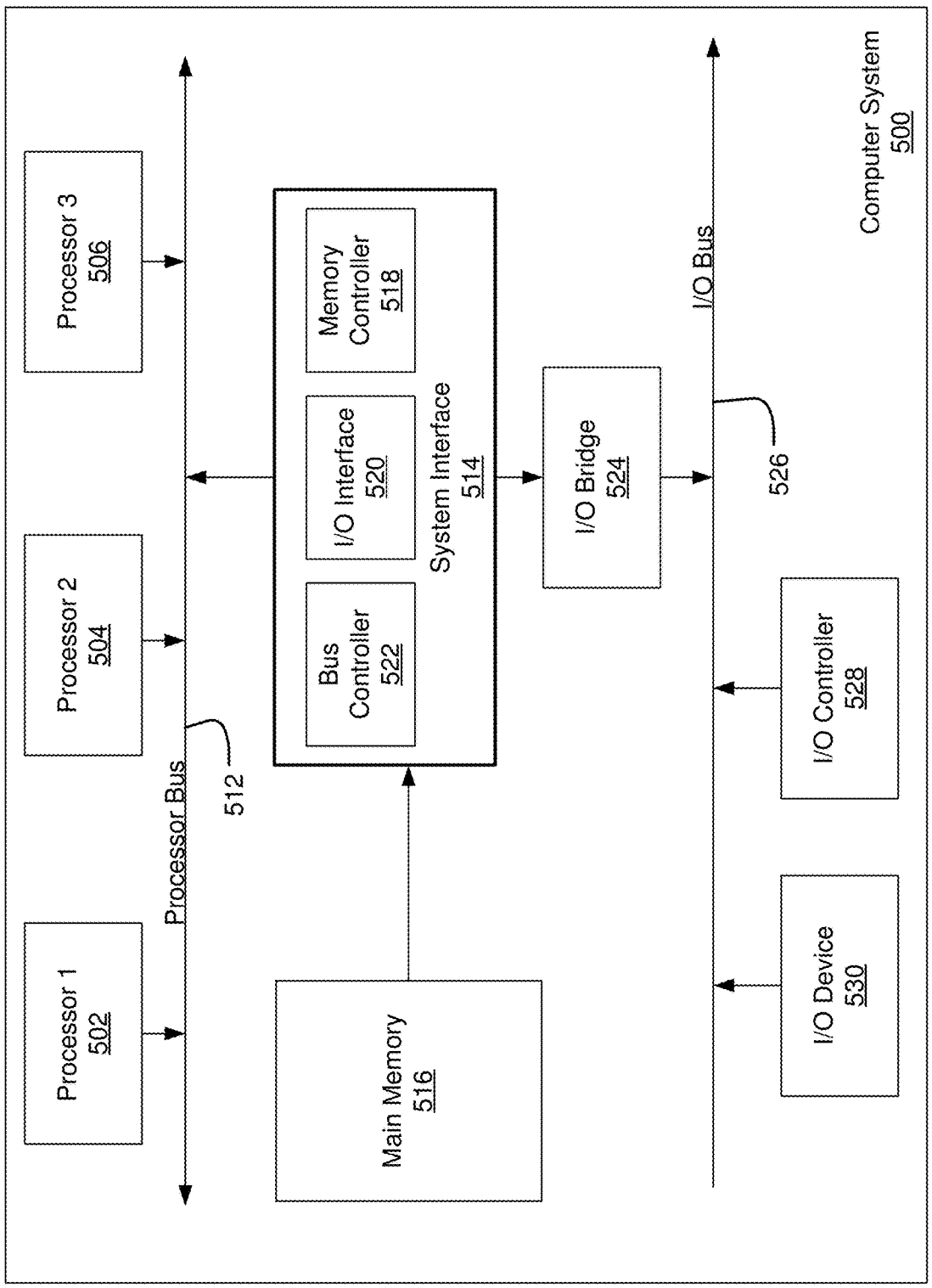
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be a computing device to manage the IP endpoint database 202 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for routing a communication in a telecommunications network, the method comprising:
   maintaining a database of a plurality of Internet Protocol (IP) endpoints associated with a particular user of the telecommunications network;
   receiving a request for an IP endpoint for the particular user from a customer network in communication with the database, the request based on a intended communication for the user received at the customer network;
   analyzing the request to determine a type of the intended communication; and
   providing the IP endpoint for the particular user to the network based at least on the type of the intended communication, the IP endpoint comprising a routing information for transmitting the communication through the telecommunications network, wherein providing the IP endpoint for the particular user is further based on a current availability status of the particular user stored in the database.

2. The method as recited in claim 1 wherein the request for the IP endpoint comprises an Electronic Number Mapping (ENUM) address for the particular user of the telecommunications network.

3. The method as recited in claim 1 wherein the intended communication for the user comprises an IP-based communication and the IP endpoint for the particular user comprises an IP address for a communication device associated with the particular user.

4. The method as recited in claim 1 wherein the intended communication for the user comprises a video-based communication and the IP endpoint for the particular user comprises an IP address for a video-capable communication device associated with the particular user.

5. The method as recited in claim 1 wherein the type of intended communication comprises a time of day indication for the communication and the IP endpoint for the particular user comprises an IP address of a communication device associated with the particular user for the time of day of the intended communication.

6. The method as recited in claim 1 further comprising:
associating the particular user of the telecommunications network with a group enterprise network; and
storing the plurality of IP endpoints associated with the particular user in a group enterprise network entry in the database.

7. A system for managing a telecommunications network, the system comprising:
a database storing a plurality of Internet Protocol (IP) endpoints associated with a particular user of the telecommunications network; and
a database management server comprising:
at least one communication port for receiving a request for one of the plurality of IP endpoints associated with the particular user from a requesting network, the request based on a intended communication for the particular user received at the customer network;
a processing device; and
a non-transitory computer-readable medium connected to the processing device configured to store instructions that, when executed by the processing device, cause the processing device to perform the operations of:
analyzing the request to determine a type of the intended communication; and
providing the one of the plurality of IP endpoints for the particular user to the requesting network based at least on the type of the intended communication, the IP endpoint comprising a routing information for transmitting the communication through the telecommunications network;
wherein the IP endpoint for the particular user comprises an IP address for a terminating device configured to play a recorded message based on the current availability status of the particular user.

8. The system as recited in claim 7 wherein the type of intended communication comprises a time of day indication for the communication and the IP endpoint for the particular user comprises an IP address of a communication device associated with the particular user for the time of day of the intended communication.

9. The system as recited in claim 7 wherein the processing device further performs the operations of: receiving the one of the plurality of IP endpoints for the particular user from a customer network; and
storing the one of the plurality of IP endpoints for the particular user in the database.

10. The system as recited in claim 7 wherein the customer network is an enterprise network and the processing device further performs the operations of:
associating the particular user with the enterprise network prior to storing the one of the plurality of IP endpoints for the particular user in the database.

11. The system as recited in claim 7 wherein the request for the one of the plurality of IP endpoints comprises an Electronic Number Mapping (ENUM) address for the particular user of the telecommunications network.

12. The system as recited in claim 7 wherein the processing device further performs the operations of: receiving one or more processing rules from the particular user for providing a requested IP endpoint of the particular user; and storing the one or more processing rules of the particular user in the database.

13. The system as recited in claim 7 wherein the intended communication for the particular user comprises an IP-based communication and the IP endpoint for the particular user comprises an IP address for a communication device associated with the particular user.

14. The system as recited in claim 7 wherein the intended communication for the particular user comprises a video-based communication and the IP endpoint for the particular user comprises an IP address for a video-capable communication device associated with the particular user.

15. A method for routing a communication in a telecommunications network, the method comprising:
maintaining a database of a plurality of Internet Protocol (IP) endpoints associated with a particular user of the telecommunications network;
receiving a request for an IP endpoint for the particular user from a customer network in communication with the database, the request based on a intended communication for the user received at the customer network;
analyzing the request to determine a type of the intended communication; and
providing the IP endpoint for the particular user to the network based at least on the type of the intended communication, the IP endpoint comprising a routing information for transmitting the communication through the telecommunications network;
receiving user schedule information from a scheduling application associated with the particular user; and
storing a current availability status of the particular user in the database.

16. The method as recited in claim 15 wherein the type of intended communication comprises a time of day indication for the communication and the IP endpoint for the particular user comprises an IP address of a communication device associated with the particular user for the time of day of the intended communication.

17. The method as recited in claim 15 further comprising:
associating the particular user of the telecommunications network with a group enterprise network; and
storing the plurality of IP endpoints associated with the particular user in a group enterprise network entry in the database.

18. The method as recited in claim 15 wherein the request for the IP endpoint comprises an Electronic Number Mapping (ENUM) address for the particular user of the telecommunications network.

19. The method as recited in claim 15 wherein the intended communication for the user comprises an IP-based communication and the IP endpoint for the particular user comprises an IP address for a communication device associated with the particular user.

20. The method as recited in claim 15 wherein the intended communication for the user comprises a video-based communication and the IP endpoint for the particular user comprises an IP address for a video-capable communication device associated with the particular user.

* * * * *